United States Patent [19]

Yamazaki et al.

[11] Patent Number: 4,691,995

[45] Date of Patent: Sep. 8, 1987

[54] LIQUID CRYSTAL FILLING DEVICE

[75] Inventors: Shunpei Yamazaki, Tokyo; Toshimitsu Konuma, Atsugi; Toshiji Hamatani, Atsugi; Akira Mase, Atsugi; Kaoru Koyanagi, Saku; Shinji Imato, Atsugi; Toshiharu Yamaguchi, Zama; Mitsunori Sakama, Hiratsuka; Takashi Inujima, Atsugi, all of Japan

[73] Assignee: Semiconductor Energy Laboratory Co., Ltd., Japan

[21] Appl. No.: 885,662

[22] Filed: Jul. 15, 1986

[30] Foreign Application Priority Data

| Jul. 15, 1985 | [JP] | Japan | 60-155835 |
| Jul. 15, 1985 | [JP] | Japan | 60-155836 |
| Jul. 15, 1985 | [JP] | Japan | 60-155837 |

[51] Int. Cl.⁴ .............................. G02F 1/13
[52] U.S. Cl. ........................ 350/331 R; 350/343
[58] Field of Search ................... 350/331 R, 343

[56] References Cited

U.S. PATENT DOCUMENTS

| 3,698,449 | 10/1972 | Sorkin et al. | 350/331 R X |
| 3,701,368 | 10/1972 | Stern | 350/331 R X |
| 3,926,502 | 12/1975 | Tanaka et al. | 350/343 |
| 4,228,574 | 10/1980 | Culley et al. | 350/331 R X |
| 4,407,870 | 10/1983 | Clerc et al. | 350/343 X |

Primary Examiner—John K. Corbin
Assistant Examiner—Richard F. Gallivan
Attorney, Agent, or Firm—Gerald J. Ferguson, Jr.; Michael P. Hoffman; Ronni S. Malamud

[57] ABSTRACT

An improved liquid crystal filling device is shown. Prior to joining a substrate with another substrate between which the liquid crystal is to be charged, the liquid crystal is dropped on the substrate and then the other substrate is superimposed on the substrate under pressure. Sandwiched between the substrates, the liquid crystal spreads at high temperature.

9 Claims, 5 Drawing Figures

LIQUID CRYSTAL FILLING DEVICE

BACKGROUND OF THE INVENTION

1. Field of the Invention

This invention relates to an improved manufacturing process for liquid crystal device, more paticular to liquid crystal filling device.

2. Prior Art of the Invention

There are well known many kinds of compact display in which liquid crystals are made of use. In such a device, liquid crystal is charged in the very thin cavity formed between opposed substrates. One of the substrates is made light transmissive and the other is made reflective so that opitical characteristics as seen from the transmissive side can be changed by controlling the electric field applied on the liquid crystal between the substrates. Contiguous to the liquid crystal and on each substrate, a pair of electrodes are formed with the liquid crystal in between. At least one of the electrode is separated into a large number of parts with which the liquid crystal constitutes A4 size display having 400×200 picture elements in cooperation with polarizing plate. Liquid crystal displays of this kind have been used broadly in microcomputors, ward processers, televisions and the like in order to cope with demands to make the device thin.

Out of processing steps to manufacture the display, charging step for filling the thin cavity without involving bubbles requires dexterity. Prior art charging steps are carried out as follow. Namely, the pair of substrates is laminated with spacers in between and the periphery of the pair is sealed off by adhesive except for an access to the interior of the thin cavity thus formed between the substrates. Then the access of the substrates are dipped in liquid crystal in a vacuum chamber having been evacuated sufficiently. Thereafter, the pressure in the vacuum chamber is increased to the atomospheric pressure whereupon the liquid crystal is injected into the cavity of about 5 to 10 thick in virtue of capillary effect. There are shortcomings, however, in the above process in respect of the following items.

(i) Workers must have skill and dexterity to carry out the charging process because of high viscosity of liquid crystal, especially of (chiral) smectic which is broadly used in this field.

(ii) It takes substantial time to fill the cavity with liquid crystal, paticularlly when one desires filling of a very thin cavity less than 4 micron thick such as ferroelectric liquid crystal (FLC) forming memory media of 0.5 to 3 micron.

(iii) Because of high temperature during the filling process (for instance, it takes 8 to 10 hours at 120° C. to charge FLC to the cavity of A4 size), the sealing structure is likely to be degraded and enter into liquid crystal as an impuruty.

(iv) The spacers tend to move during injection of the liquid crystal and flock apart from the access.

(v) It is wastful that a large part (approx. 90%) of the expensive liquid remains uncharged out of the cavity in vain.

SUMMARY OF THE INVENTION

It is an object of the invention to provide an improved liquid crystal filling device having high reliability.

It is another object of the invention to provide an improved liquid crystal filling device capable of forming a liquid crystal layer of uniform thickness.

It is further object of the invention to provide an improved filling device capable of the fast charging of liquid crystal.

It is further object of the invention is to provide an economic filling device in which an amount of liquid crystal is efficiently utilized.

BRIEF DESCRIPTION OF THE DRAWINGS

FIGS. 1 (A) through 1(E) explanatory views showing manufacturing process according to the invention.

BRIEF DESCRIPTION OF THE INVENTION

In view of the conventional shortcomings, the inventors employ the filling method of liquid crystal in which an amount of the liquid crystal is disposed on one of substrates prior to joining the substrates to constitute a cavity in between and thereafter the liquid crystal is let spread by being sandwiched between the substrates under pressure. According to this filling process, all the parts of the liquid crystal are disposed within the cavity between the substrates. For instance, 0.2 cc of liquid crystal is sufficient to prepare a A4 size display (20 cm×30 cm). This is very economic. Further such a process requires processing time only about one hour to complete the filling.

So far, it has been believed as an important matter to carry out a filling process without applying any stress to the liquid crystal layer. Because of this, peripheral sealing means is functioning also as a strut protecting the liquid crystal from being subjected to stress.

The inventors have confirmed that a liquid crystal layer such as of smectic phase is less influenced by stress applied thereon because of high viscosity of the liquid crystal and not degraded even after undergoing rough treatment such as of the invention.

According to the invention, since filling of liquid crystal is made before completion of joining of substrates and sealing, orientation of a liquid crystal layer can be accomplished by slightly offsetting one of the substrates in regard to the other by 1 to $10^4$ micron meters at somewhat high temperature.

DETAILED DESCRIPTION OF THE PREFERRED EMBODIMENT

Referring to FIGS. 1(A) through 1(E), a liquid crystal filling device and process according to the invention are shown.

Figure 1A:
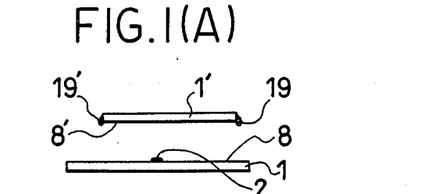

In FIG. 1(A), a pair of substrates is with opposed insides thereof on which are provided with paterned electrode for defining picture elements. The substrates 1 are made of glass pane such as of coning 7059. If color display is desired, color filter may be disposed between the electrode and the substrate or between the electrode and the liquid crystal layer. A contiguous surfice of the electrode to liquid crystal is made an orientation treated surface. Although, in the figures, only a pair of substrates is shown, descriptions are dispensed with for the electrodes, filters, oriented films, shadow masks, active elements or so on, fearing confusion between element in the view.

The electrode of the lower substrate 1 is oriented at its upper surfice. On the oriented surface is placed an amount of liquid crystal 2 such as S8 (octyl-oxy-benzylidene-amino-methylebuthyl-benzoate) at one or more spot. In addition, on a number of spots in diverse positions of the periphry of the upper substrate 1 are put amounts of thrmosetting resin, e.g., epoxy resin especially at the corner portion.

Figure 1B:
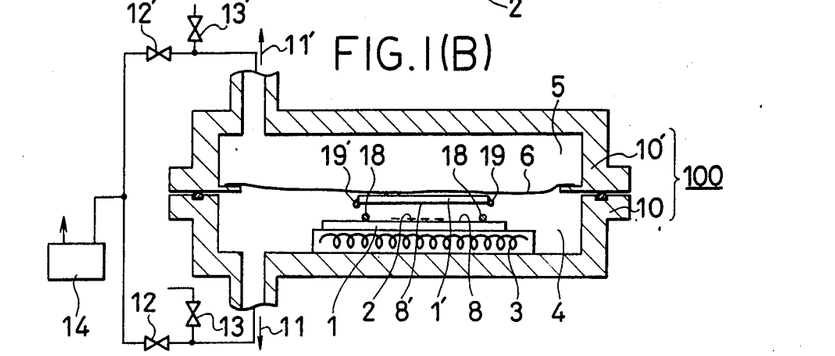

The substrates 1 are carried in a vacuum chamber 100 comprising an upper member 10' and a lower member 10 and separated into first and second spaces 4 and 5 by a silicon rubber sheet 6. The two substrates are clamped togather in air tight manner. After removing the upper member 10' from the lower member 10, the lower substrate 1 is placed on a heater provided in the first chamber 4. Then, the temperature of the substrate 1 is raised to a prescribed temperature (e.g., 120° C.) chosen between room temperature and 150° C. at which the liquid crystal has sufficiently low viscosity, normally higher than 70° C., so that the amount of the liquid crystal can be extended. A number of spacer may be placed apart from each other at an appropreate step of above.

With the upper substrate 1 held above the lower substrate 1 at a suitable distance, e.g., 1 mm to 10 mm, the first member 10 is fitted with the second member 10'. The contact between the first and second member 10 and 10' is sealed off by a O-ring. The first and second spaces 4 and 5 are entirely separated in air-tight manner by the flexible sheet 6.

Figure 1C:
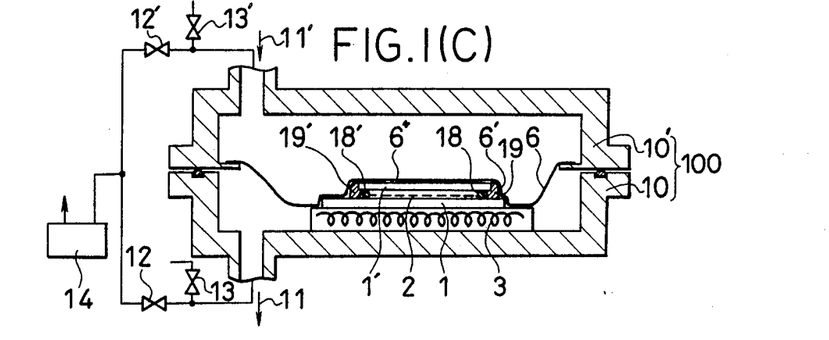

Thereafter, both the first and second spaces 4 and 5 are evacuated simultaneously by a vacuum pump 14 with valves 12 and 12' opened and valves 13 and 13' closed. Upon superposing the upper substrate 1 on the second substrate 1 with confirming coincidence of the pair of substrates 1, the pressure of the second space 5 is let increase gradually to the atmospheric pressure by leak through the valve 13'. By virtue of differential pressure between the first and second spaces, the silicon rubber 6 extends downward and suppresses the upper substrate 1 to the lower substrate 1 under the atomospheric pressure of 1 kg/cm². If necessary, further pressure may be added by introducing pressurized nitrogen.

In this manner, the amount of liquid crystal on the substrate 1 is extended under the uniform pressure between the subatrates and constitutes a laminate structure with the pair of the substrates 1. In the same manner, the sealing resin is elongated at the corner region of the substrate 1 so that the substrates 1 are joined with an area of 1 to 15 mm² surrounded by the elongated resin.

To avoid overextention of the liquid crystal and contact of the liquid crystal with the sealing resin, a fiber barrier 18 of 1 to 3 micron may be placed around the liquid crystal, especially at the corner.

In case where the spacers are employed, the gap between the substrates can be precisely controlled by choosing the diameter of the spacers. The diameter of the spacer exactly corresponding to the gap between the substrates 1.

In case where the spacers are not used, the gap between the substrates 1 can be adjusted by precisely controlling the differential pressure between the first snd second spaces 4 and 5 and temperature of the substrate 1.

The amount of the liquid crystal has to be suitably prescribed to avoid falling short of prevailing throughout the desired area while overflow is avoided by virtue of the barrior and the sealing.

Figure 1D:
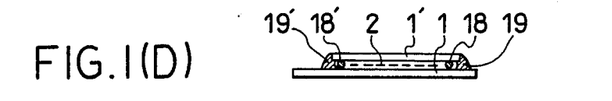

After completion of the filling process, the heater 3 is turned off and the pressure of the first space 4 is increased to the atmospheric pressure. Then, the second member 10' is removed from the first member 10 and the laminated substrates 1 thus processed are taken out.

Figure 1E:
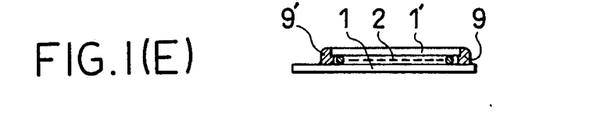

For security, the periphery of the substrate may be covered with prastic sealing material 9 as shown FIG. 1(E). According to the invention, filling process can be completed within only about one hour far short compared to the prior art process which takes several hours to complete a filling.

It will be obvious that the device may be readly modified without departing from the spirit of the invention as described below.

In place of the hard glass substrate, a flexible substrate can be used, e.g., glass sheet of 0.3 to 0.6 mm thickness cured with chemical reinforcing treatment, a transmissive heat-proof organic resin sheet such as polyimide, PAN, PET, or the like.

The step of holding the upper member 10' over and apart from the lower member 10 prior to applying pressure is not indispensible. In the step, the upper member 10' can be placed on the lower member making partial contact in stead.

As a partition member between the first and second spaces, any flexible sheet can be employed instead of the silicon rubber sheet 8 as long as it has heat resistance at least against 500° C.

What is claimed is:

1. A liquid crystal filling system comprising:
   a vacuum chamber;
   a flexible sheet provided in the chamber and separating the chamber into first and second spaces in an air tight manner; and
   first and second evacuating devices for said first and second spaces.

2. A system of claim 1 further comprising a heater provided in the first space.

3. A system of claim 2 wherein said chamber comprises a first member forming the first space with the flexible sheet and a second member forming the second chamber.

4. A system of claim 3 wherein said second member is joined to the first member in an air tight manner and can be removed from the first member together with the flexible sheet.

5. A liquid crystal filling method comprising:
   (1) a step of preparing first and second substrates;
   (2) a step of placing an amount of liquid crystal on the first substrate;
   (3) a step of laying the second substrate on the first substrate coincident with each other;
   (4) a step of applying pressure to the second substrate toward the first substrate; and
   (5) a step of making a sealing structure on the periphery of the substrates.

6. A method of claim 5 wherein the method is carried out in the device of claim 1.

7. A method of claim 6 further comprising:
   (2b) a step of placing the first substrate in the first space;
   (3a) a step of evacuating the first and second spaces;
   (3b) a step of increasing the pressure of the second space;
   (3c) a step of rendering the flexible sheet to extend downward.

8. A method of claim 7 further comprising:
   (2a) a step of placing an amount of adhesive on the peripheral portion of the first substrate.

9. A method of claim 8 wherein said adhesive is epoxy resin.

* * * * *

(12) EX PARTE REEXAMINATION CERTIFICATE (4989th)
United States Patent
Yamazaki et al.

(10) Number: US 4,691,995 C1
(45) Certificate Issued: Sep. 14, 2004

(54) LIQUID CRYSTAL FILLING DEVICE

(75) Inventors: Shunpei Yamazaki, Tokyo (JP); Toshimitsu Konuma, Atsugi (JP); Toshiji Hamatani, Atsugi (JP); Akira Mase, Atsugi (JP); Kaoru Koyanagi, Saku (JP); Shinji Imato, Atsugi (JP); Toshiharu Yamaguchi, Zama (JP); Mitsunori Sakama, Hiratsuka (JP); Takashi Inujima, Atsugi (JP)

(73) Assignee: Semiconductor Energy Laboratory Co., Ltd., Atsugi (JP)

Reexamination Request:
No. 90/006,562, Mar. 13, 2003

Reexamination Certificate for:
Patent No.: 4,691,995
Issued: Sep. 8, 1987
Appl. No.: 06/886,662
Filed: Jul. 15, 1986

(30) Foreign Application Priority Data

Jul. 15, 1985 (JP) ............................... 60-155835
Jul. 15, 1985 (JP) ............................... 60-155836
Jul. 15, 1998 (JP) ............................... 60-155837

(51) Int. Cl.[7] ................ G02F 1/1341; G02F 1/13
(52) U.S. Cl. ............... 349/189; 349/153; 359/900
(58) Field of Search ............... 349/153, 154, 349/187, 189, 190; 359/900

(56) References Cited

U.S. PATENT DOCUMENTS 3,892,471 A * 7/1975 Biermann et al. .......... 349/142
4,325,610 A * 4/1982 Inoue .......................... 349/190
4,409,268 A * 10/1983 Inoue et al. .................. 428/1.6
4,470,667 A * 9/1984 Okubo et al. ................. 349/42
4,482,213 A * 11/1984 Piliavin et al. ............. 349/153
4,705,345 A * 11/1987 Ayliffe et al. ................. 345/97

FOREIGN PATENT DOCUMENTS

| JP | 47-18298 | 9/1972 |
| JP | 49-126350 | 12/1974 |
| JP | 50-15495 | 5/1975 |
| JP | 51-65656 | 6/1976 |
| JP | 53-91763 | 8/1978 |
| JP | 57-124827 | 8/1982 |
| JP | 59-57221 | 4/1984 |
| JP | 59-171925 | 9/1984 |
| JP | 59-195222 | 11/1984 |
| JP | 60-21028 | 2/1985 |
| JP | 60-75817 | 4/1985 |
| JP | 60-111221 | 6/1985 |
| JP | 60-126624 | 7/1985 |
| JP | 61-190313 | 8/1986 |
| JP | 62-015520 | 1/1987 |

OTHER PUBLICATIONS

"E1: Active Matrix Addressing", Jun. 1984, SID International Symposium Digest of Technical Papers, pp. 74–75.*

* cited by examiner

Primary Examiner—Andrew Schechter (57) ABSTRACT

An improved liquid crystal filling device is shown. Prior to joining a substrate with another substrate between which the liquid crystal is to be charged, the liquid crystal is dropped on the substrate and then the other substrate is superimposed on the substrate under pressure. Sandwiched between the substrates, the liquid crystal spreads at high temperature.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

+c ONLY THOSE PARAGRAPHS OF THE SPECIFICATION AFFECTED BY AMENDMENT ARE PRINTED HEREIN.

Column 2, lines 51–63:

In FIG. 1(A), a pair of substrates is with opposed insides thereof on which are provided with [paterned] *patterned* electrode for defining picture elements. The substrates 1 *and 1'* are made of glass pane such as of [coning] *Corning* 7059. If color display is desired, color filter may be disposed between the electrode and the substrate or between the electrode and the liquid crystal layer. A contiguous [surfice] *surface* of the electrode to liquid crystal is made an orientation treated [surfice] *surface*. Although, in the figures, only a pair of substrates is shown, descriptions are dispensed with for the electrodes, filters, oriented films, shadow masks, active elements or so on, fearing confusion between element in the view.

Column 2, line 64 to Column 3, line 3:

The electrode of the lower substrate 1 is oriented at its upper [surfice] *surface* 8. On the oriented surface is placed and amount of liquid crystal 2 such as S8 (octyl-oxy-benzylidene-amino-methylebuthyl-benzoate) at one or more spots. In addition, on a number of spots in diverse positions of the [periphry] *periphery* of the upper substrate 1' are put amounts of [thrmosetting] *thermosetting* resin, e.g., epoxy resin especially at the corner portion.

Column 3, lines 4–17:

The substrates 1 *and 1'* are carried in a vacuum chamber 100 comprising an upper member 10' and a lower member 10 and separated into first and second spaces 4 and 5 by a silicon rubber sheet 6. The two substrates are clamped [togather] *together* in air tight manner. After removing the upper member 10' from the lower member 10, the lower substrate 1 is placed on a heater provided in the first chamber 4. Then, the temperature of the substrate 1 is raised to a prescribed temperature (e.g., 120° C.) chosen between room temperature and 150° C. at which the liquid crystal has sufficiently low viscosity, normally higher than 70° C., so that the amount of the liquid crystal can be extended. A number of spacers may be placed apart from each other at an [appropreate] *appropriate* step of above.

Column 3, lines 18–24:

With the upper substrate 1' held above the lower substrate 1 at a suitable distance, e.g., 1 mm to 10 mm, the first member 10 is fitted with the second member 10'. The contact between the first and second member 10 and 10' is sealed off by a O-ring. The first and second spaces 4 and 5 are entirely separated in air-tight manner by the flexible sheet 6.

Column 3, lines 25–37:

Thereafter, both the first and second spaces 4 and 5 are evacuated simultaneously by a vacuum pump 14 with valves 12 and 12' opened and valves 13 and 13' closed. Upon superposing the upper substrate 1' on the second substrate 1 with confirming coincidence of the pair of substrates 1 *and 1'*, the pressure of the second space 5 is [let] increase*d* gradually to the atmospheric pressure by leak through the valve 13'. By virtue of differential pressure between the first and second spaces, the silicon rubber 6 extends downward and suppresses the upper substrate 1' to the lower substrate 1 under the [atomospheric] *atmospheric* pressure of 1 kg/cm². If necessary, further pressure may be added by introducing pressurized nitrogen.

Column 3, lines 38–44:

In this manner, the amount of liquid crystal on the substrate 1 is extended under the uniform pressure between the [subatrates] *substrates* and constitutes a laminate structure with the pair of the substrates 1 *and 1'*. In the same manner, the sealing resin is elongated at the corner region of the substrate 1 so that the substrates 1 *and 1'* are joined with an area of 1 to 15 mm² surrounded by the elongated resin.

Column 3, lines 49–53:

In case where the spacers are employed, the gap between the substrates can be precisely controlled by choosing the diameter of the spacers. The diameter of the spacer exactly corresponding to the gap between the substrates 1 *and 1'*.

Column 3, lines 54–58:

In case where the spacers are not used, the gap between the substrates 1 *and 1'* can be adjusted by precisely controlling the differential pressure between the first [snd] *and* second spaces 4 and 5 and temperature of the substrate 1.

Column 3, lines 59–62:

The amount of the liquid crystal has to be suitably prescribed to avoid falling short of prevailing throughout the desired area while overflow is avoided by virture of the [barrior] *barrier* and the sealing.

Column 3, line 63 to Column 4, line 6:

After completion of the filling process, the heater 3 is turned off and the pressure of the first space 4 is increased to the [atomospheric] *atmospheric* pressure. Then, the second member 10' is removed from the first member 10 and the laminated substrates 1 *and 1'* thus processed are taken out. For security, the periphery of the substrate may be covered with [prastic] *plastic* sealing material 9 as shown FIG. 1(E). According to the invention, filling process can be completed within only about one hour far short compared to the prior art process which takes several hours to complete a filling.

Column 4, lines 8–10:

It will be obvious that the device may be [readly] *readily* modified without departing from the spirit of the invention as described below.

Column 4, lines 20–23:

As a partition member between the first and second spaces, any flexible sheet can be employed instead of the silicon rubber sheet [8] *6* as long as it has heat resistance at least against 500° C.

AS A RESULT OF REEXAMINATION, IT HAS BEEN DETERMINED THAT:

Claims 1–4 and 6 are cancelled.

Claims 5 and 7 are determined to be patentable as amended.

Claims 8 and 9, dependent on an amended claim, are determined to be patentable.

New claims 10–120 are added and determined to be patentable.

5. A liquid crystal filling method comprising:

(1) a step of preparing first and second substrates;

(2) a step of placing an amount of liquid crystal on *plural locations of* the first substrate;

(3) a step of laying the second substrate on the first substrate coincident with each other;

(4) a step of applying pressure to the second substrate toward the first substrate; and (5) a step of making *a barrier and* a sealing structure on the periphery of the *first and second* substrates.

7. A method of claim [6] *5* further comprising:
(2b) a step of placing the first substrate in the first space;
(3a) a step of evacuating the first and second spaces;
(3b) a step of increasing the pressure of the second space;
(3c) a step of rendering the flexible sheet to extend downward.

10. A liquid crystal filling method comprising:
(1) a step of preparing first and second substrates provide with active elements;
(2) a step of placing an amount of liquid crystal on plural locations of the first substrate;
(3) a step of laying the second substrate on the first substrate coincident with each other;
(4) a step of applying pressure to the second substrate toward the first substrate; and
(5) a step of making a sealing structure on the periphery of the first and second substrates.

11. A liquid crystal filling method comprising:
(1) a step of preparing first and second substrates;
(2) a step of placing an amount of liquid crystal on plural locations of the first substrate;
(3) a step of laying the second substrate on the first substrate coincident with each other;
(4) a step of applying pressure to the second substrate toward the first substrate; and
(5) a step of making a sealing structure on the periphery of the first and second substrates.

12. A liquid crystal filling method comprising:
(1) a step of preparing first and second substrates;
(2) a step of placing an amount of liquid crystal on the first substrate;
(3) a step of laying the second substrate on the first substrate coincident with each other;
(4) a step of applying pressure to the second substrate toward the first substrate; and
(5) a step of making a sealing structure on the periphery of the first and second substrates,
wherein the method further comprises a step of disposing a thermosetting resin on a periphery of the second substrate.

13. A method of claim 12, wherein said thermosetting resin comprises an epoxy resin.

14. A method of claim 12, wherein said thermosetting resin is placed on corners of said substrate.

15. A liquid crystal filling method comprising:
(1) a step of preparing first and second substrates;
(2) a step of placing an amount of liquid crystal on the first substrate;
(3) a step of laying the second substrate on the first substrate coincident with each other;
(4) a step of applying pressure to the second substrate toward the first substrate in a chamber by evacuating said chamber with said first and second substrates located in said chamber; and
(5) a step of making a sealing structure on the periphery of the first and second substrates.

16. A liquid crystal filling method comprising:
(1) a step of preparing first and second substrates;
(2) a step of placing an amount of liquid crystal on the first substrate;
(3) a step of laying the second substrate on the first substrate coincident with each other;
(4) a step of applying pressure to the second substrate toward the first substrate; and
(5) a step of making a sealing structure on the periphery of the first and second substrates,
wherein said liquid crystal is heated on said first substrate.

17. A liquid crystal filling method comprising:
(1) a step of preparing first and second substrates;
(2) a step of placing an amount of liquid crystal on the first substrate;
(3) a step of laying the second substrate on the first substrate coincident with each other;
(4) a step of applying pressure to the second substrate toward the first substrate at 1 $kg/cm^2$ or higher; and
(5) a step of making a sealing structure on the periphery of the first and second substrates.

18. A liquid crystal filling method comprising:
(1) a step of preparing first and second substrates;
(2) a step of placing an amount of liquid crystal on plural locations of the first substrate;
(3) a step of laying the second substrate on the first substrate coincident with each other;
(4) a step of applying pressure to the second substrate toward the first substrate; and
(5) a step of making a sealing structure on the periphery of the first and second substrates,
wherein the method further comprises a step of covering the periphery of the first and second substrates with a plastic sealing material.

19. A method according to any one of claims 10, 11, 12, 15, 16, 17 or 18, wherein at least one of the first and second substrates is a glass substrate.

20. A method according to any one of claims 10, 11, 12, 15, 16, 17, or 18, wherein at least one of the first and second substrates is a flexible substrate.

21. A method according to any one of claims 10, 11, 12, 15, 16, 17 or 18, wherein at least one of the first and second substrates is an organic resin substrate.

22. A liquid crystal filling method comprising:
(1) a step of preparing first and second substrates;
(2) a step of placing an amount of liquid crystal on plural locations of the first substrates;
(3) a step of laying the second substrate on the first substrate coincident with each other;
(4) a step of applying pressure to the second substrate toward the first substrate; and
(5) a step of making a sealing structure on the periphery of the first and second substrates,
wherein a color filter is formed between said liquid crystal and at least one of the first and second substrates.

23. A method according to claim 22, wherein at least one of the first and second substrate is a glass substrate.

24. A method according to claim 22, wherein active elements are provided with the first substrate.

25. A liquid crystal filling method comprising:
(1) a step of preparing first and second substrates;
(2) a step of placing an amount of liquid crystal on plural locations of the first substrate;
(3) a step of laying the second substrate on the first substrate coincident with each other;
(4) a step of applying pressure to the second substrate toward the first substrate; and
(5) a step of making a sealing structrue on the periphery of the first and second substrates, wherein an electrode having an orientation-treated surface is formed between said liquid crystal and at least one of the first and second substrates.

26. A method according to claim 25, wherein at least one of the first and second substrate is a glass substrate.

27. A method according to claim 25, wherein active elements are provided with the first substrate.

28. A liquid crystal filling method comprising:

(1) a step of preparing first and second substrates;

(2) a step of placing an amount of liquid crystal on plural locations of the first substrate;

(3) a step of laying the second substrate on the first substrate coincident with each other;

(4) a step of applying pressure to the second substrate toward the first substrate; and (5) a step of making a sealing structure on the periphery of the first and second substrates, wherein at least one of an electrode, a filter, an oriented film, a shadow mask and an active element is formed between the first and second substrates.

29. A method according to claim 28, wherein at least one of the first and second substrate is a glass substrate.

30. A method according to claim 28, wherein active elements are provided with the first substrate.

31. A liquid crystal filling method comprising:

(1) a step of preparing first and second substrates;

(2) a step of placing an amount of liquid crystal on plural locations of the first substrate;

(3) a step of laying the second substrate on the first substrate coincident with each other;

(4) a step of applying pressure to the second substrate toward the first substrate; and (5) a step of making a sealing structure on the periphery of the first and second substrates so that the liquid crystal is surrounded by a resin.

32. A method according to claim 31, wherein at least one of the first and second substrate is a glass substrate.

33. A method according to claim 31, wherein active elements are provided with the first substrate.

34. A liquid crystal filling method comprising:

(1) a step of preparing first and second substrates;

(2) a step of placing an amount of liquid crystal on plural locations of the first substrate;

(3) a step of laying the second substrate on the first substrate coincident with each other;

(4) a step of applying pressure to the second substrate toward the first substrate; and (5) a step of making a sealing structure on the periphery of the first and second substrates, said method further comprising a step of providing a spacer between the first and second substrates, wherein a diameter of said spacer is corresponding to a gap between the first and second substrates.

35. A method according to claim 34, wherein at least one of the first and second substrate is a glass substrate.

36. A method according to claim 34, wherein active elements are provided with the first substrate.

37. A liquid crystal filling method comprising:

(1) a step of preparing first and second substrates;

(2) a step of placing an amount of liquid crystal on the first substrate;

(3) a step of laying the second substrate on the first substrate coincident with each other;

(4) a step of applying pressure to the second substrate toward the first substrate; and (5) a step of making a barrier and a sealing structure on the periphery of the first and second substrates.

38. A method according to claim 37, wherein at least one of the first and second substrate is a glass substrate.

39. A method according to claim 37, wherein active elements are provided with the first substrate.

40. A liquid crystal filling method comprising:

(1) a step of preparing first and second substrates provided with active elements;

(2) a step of placing an amount of liquid crystal on plural locations of the first substrate;

(3) a step of laying the second substrate on the first substrate coincident with each other;

(4) a step of applying pressure to the second substrate toward the first substrate; and (5) a step of making a sealing structure on the periphery of the first and second substrates, wherein a color filter is formed between said liquid crystal and at least one of the first and second substrates.

41. A method according to claim 40, wherein at least one of the first and second substrate is a glass substrate.

42. A liquid crystal filling method comprising:

(1) a step of preparing first and second substrates;

(2) a step of placing an amount of liquid crystal on plural locations of the first substrate;

(3) a step of laying the second substrate on the first substrate coincident with each other;

(4) a step of applying pressure to the second substrate toward the first substrate; and (5) a step of making a sealing structure on the periphery of the first and second substrates, wherein at least one of the first and second substrates is a flexible substrate.

43. A method according to claim 42, wherein the flexible substrate comprises a material selected from the group consisting of PI, PAN and PET.

44. A method according to claim 42, wherein at least one of the first and second substrate is a glass substrate.

A method according to claim 42, wherein active elements are provided with the first substrate.

A liquid crystal filling method comprising:

(1) a step of preparing first and second substrates;

(2) a step of placing an amount of liquid crystal on the first substrate;

(3) a step of laying the second substrate on the first substrate coincident with each other;

(4) a step of applying pressure to the second substrate toward the first substrate; and (5) a step of making a sealing structure on the periphery of the first and second substrates, wherein the method further comprises a step of heating the liquid crystal on the first substrate to a temperature at which the liquid crystal has low viscosity.

47. A method according to claim 46, wherein at least one of the first and second substrate is a glass substrate.

48. A method according to claim 46, wherein active elements are provided with the first substrate.

49. A method according to claim 46, wherein the temperature is 70 to 150° C.

50. A liquid crystal filling method comprising:

(1) a step of preparing first and second substrates;

(2) a step of placing an amount of liquid crystal on the first substrate;

(3) a step of laying the second substrate on the first substrate coincident with each other;

(4) a step of applying pressure to the second substrate toward the first substrate; and (5) a step of making a sealing structure on the periphery of the first and second substrates, wherein the method further comprises a step of treating the liquid crystal on the first substrate such that the liquid crystal has low viscosity.

51. A method according to claim 50, wherein at least one of the first and second substrate is a glass substrate.

52. A method according to claim 50, wherein active elements are provided with the first substrate.

53. A liquid crystal filling method comprising:

(1) a step of preparing first and second substrates provided with active elements;

(2) a step of placing an amount of liquid crystal on plural locations of the first substrate;

(3) a step of laying the second substrate on the first substrate coincident with each other;

(4) a step of applying pressure to the second substrate toward the first substrate; and (5) a step of making a sealing structure on the periphery of the first and second substrates, wherein the liquid crystal is filled so as not to overflow from the first and second substrates.

54. A method according to claim 53, wherein at least one of the first and second substrates is a glass substrate.

55. A method according to claim 53, wherein active elements are provided with the first substrate.

56. A liquid crystal filling method comprising:

(1) a step of preparing first and second substrates;

(2) a step of placing an amount of liquid crystal on plural locations of the first substrate;

(3) a step of laying the second substrate on the first substrate coincident with each other;

(4) a step of applying pressure to the second substrate toward the first substrate; and (5) a step of making a sealing structure on the periphery of the first and second substrates, wherein the liquid crystal is filled so as not to overflow from the first and second substrates.

57. A method according to claim 56, wherein at least one of the first and second substrates is a glass substrate.

58. A method according to claim 56, wherein active elements are provided with the first substrate.

59. A liquid crystal filling method comprising:

(1) a step of preparing first and second substrates;

(2) a step of placing an amount of liquid crystal on the first substrate;

(3) a step of laying the second substrate on the first substrate coincident with each other;

(4) a step of applying pressure to the second substrate toward the first substrate in a chamber by evacuating the chamber; and (5) a step of making a sealing structure on the periphery of the first and second substrates, wherein the method further comprises a step of heating the first substrate prior to pressing the liquid crystal and a step of stopping the heating after the pressing.

60. A method according to claim 59, wherein at least one of the first and second substrates is a glass substrate.

61. A method according to claim 59, wherein active elements are provided with the first substrate.

62. A liquid crystal filling method comprising:

(1) a step of preparing first and second substrates provided with active elements;

(2) a step of placing an amount of liquid crystal on plural locations of the first substrate;

(3) a step of laying the second substrate on the first substrate coincident with each other;

(4) a step of applying pressure to the second substrate toward the first substrate so that the liquid crystal is extended between the first substrate and the second substrate without overflowing; and (5) a step of making a sealing structure on the periphery of the first and second substrates.

63. A method according to claim 62, wherein at least one of the first and second substrates is a glass substrate.

64. A method according to claim 62, wherein active elements are provided with the first substrate.

65. A liquid crystal filling method comprising:

(1) a step of preparing first and second substrates;

(2) a step of placing an amount of liquid crystal on plural locations of the first substrate;

(3) a step of laying the second substrate on the first substrate coincident with each other;

(4) a step of applying pressure to the second substrate toward the first substrate so that the liquid crystal is extended between the first substrate and the second substrate without overflowing; and (5) a step of making a sealing structure on the periphery of the first and second substrates.

66. A method according to claim 65, wherein at least one of the first and second substrates is a glass substrate.

67. A method according to claim 65, wherein active elements are provided with the first substrate.

68. A liquid crystal filling method comprising:

(1) a step of preparing first and second substrates;

(2) a step of placing an amount of liquid crystal on the first substrate;

(3) a step of laying the second substrate on the first substrate coincident with each other;

(4) a step of applying pressure to the second substrate toward the first substrate so that the liquid crystal is extended between the first substrate and the second substrate without overflowing; and (5) a step of making a sealing structure on the periphery of first and second the substrates, wherein the liquid crystal is heated on the first substrate.

69. A method according to claim 68, wherein at least one of the first and second substrates is a glass substrate.

70. A method according to claim 68, wherein active elements are provided with the first substrate.

71. A liquid crystal filling method comprising:

(1) a step of preparing first and second substrates;

(2) a step of placing an amount of liquid crystal on the first substrate;

(3) a step of laying the second substrate on the first substrate coincident with each other;

(4) a step of applying pressure the second substrate toward the first substrate so that liquid crystal is extended between the first substrate and the second substrate without overflowing; and (5) a step of making a sealing structure on the periphery of the first and second substrates, wherein the method further comprises a step of treating the liquid crystal on the first substrate so that the liquid crystal has low viscosity.

72. A method according to claim 71, wherein at least one of the first and second substrates is a glass substrate.

73. A method according to claim 71, wherein active elements are provided with the first substrate.

74. A liquid crystal filling method comprising:
   (1) a step of preparing first and second substrates;
   (2) a step of placing an amount of liquid crystal on the first substrate;
   (3) a step of laying the second substrate on the first substrate coincident with each other;
   (4) a step of applying pressure to the second substrate toward the first substrate so that the liquid crystal is extended between the first and second substrates; and
   (5) a step of making a sealing structure on the periphery of the first and second substrates,
   wherein the method further comprises a step of applying a sealing resin on the second substrate,
   wherein the sealing resin prevents the liquid crystal from overflowing when applying the pressure to the second substrate.

75. A method according to claim 74, wherein at least one of the first and second substrates is a glass substrate.

76. A method according to claim 74, wherein active elements are provided with the first substrate.

77. A liquid crystal filling method comprising:
   (1) a step of preparing first and second substrates provided with active elements;
   (2) a step of placing an amount of liquid crystal on the first substrate;
   (3) a step of laying the second substrate on the first substrate coincident with each other;
   (4) a step of applying pressure to the second substrate toward the first substrate so that the liquid crystal is extended between the first and second substrates; and
   (5) a step of making a sealing structure on the periphery of the first and second substrates,
   wherein the method further comprises a step of applying a sealing resin on the second substrate,
   wherein the sealing resin prevents the liquid crystal from overflowing when applying the pressure to the second substrate.

78. A method according to claim 77, wherein at least one of the first and second substrates is a glass substrate.

79. A method according to claim 77, wherein active elements are provided with the first substrate.

80. A liquid crystal filling method comprising:
   (1) a step of preparing first and second substrates;
   (2) a step of placing an amount of liquid crystal on plural locations of the first substrate;
   (3) a step of laying the second substrate on the first substrate coincident with each other;
   (4) a step of applying pressure to the second substrate toward the first substrate so that the liquid crystal is extended between the first and second substrates; and
   (5) a step of making a sealing structure on the periphery of the first and second substrates,
   wherein the method further comprises a step of applying a sealing resin on the second substrate,
   wherein the sealing resin prevents the liquid crystal from overflowing when applying the pressure to the second substrate.

81. A method according to claim 80, wherein at least one of the first and second substrates is a glass substrate.

82. A method according to claim 80, wherein active elements are provided with the first substrate.

83. A liquid crystal filling method comprising:
   (1) a step of preparing first and second substrates;
   (2) a step of placing an amount of liquid crystal on plural locations of the first substrate;
   (3) a step of laying the second substrate on the first substrate coincident with each other;
   (4) a step of applying pressure to the second substrate toward the first substrate; and
   (5) a step of making a sealing structure on the periphery of the first and second substrates,
   wherein the method further comprises a step of treating the liquid crystal on the first substrate so that the liquid crystal has low viscosity.

84. A liquid crystal filling method comprising:
   (1) a step of preparing first and second substrates provided with active elements;
   (2) a step of placing an amount of liquid crystal on the first substrate;
   (3) a step of laying the second substrate on the first substrate coincident with each other;
   (4) a step of applying pressure to the second substrate toward the first substrate; and
   (5) a step of making a barrier and a sealing structure on the periphery of the first and second substrates.

85. A liquid crystal filling method comprising:
   (1) a step of preparing first and second substrates provided with active elements;
   (2) a step of placing an amount of liquid crystal on the first substrate;
   (3) a step of laying the second substrate on the first substrate coincident with each other;
   (4) a step of applying pressure to the second substrate toward the first substrate in a chamber by evacuating the chamber with the first and second substrates located in the chamber; and
   (5) a step of making a sealing structure on the periphery of the first and second substrates.

86. A liquid crystal filling method comprising:
   (1) a step of preparing first and second substrates provided with active elements;
   (2) a step of placing an amount of liquid crystal on the first substrate;
   (3) a step of laying the second substrate on the first substrate coincident with each other;
   (4) a step of applying pressure to the second substrate toward the first substrate; and
   (5) a step of making a sealing structure on the periphery of the first and second substrates,
   wherein the method further comprises a step of treating the liquid crystal on the first substrate so that the liquid crystal has low viscosity.

87. A liquid crystal filling method comprising:
   (1) a step of preparing first and second substrates;
   (2) a step of placing an amount of liquid crystal on the first substrate;
   (3) a step of laying the second substrate on the first substrate coincident with each other;
   (4) a step of applying pressure to the second substrate toward the first substrate in a chamber by evacuating the chamber with the first and second substrates located in the chamber; and (5) a step of making a sealing structure on the periphery of the first and second substrates, wherein the method further comprises a step of covering the periphery of the first and second substrates with a plastic sealing material.

88. A liquid crystal filling method comprising:

(1) a step of preparing first and second substrates;

(2) a step of placing an amount of liquid crystal on the first substrate;

(3) a step of laying the second substrate on the first substrate coincident with each other;

(4) a step of applying pressure to the second substrate toward the first substrate; and (5) a step of making a sealing structure on the periphery of the first and second substrates, wherein the method further comprises a step of treating the liquid crystal on the first substrate so that the liquid crystal has low viscosity, wherein the method further comprises a step of covering the periphery of the first and second substrates with a plastic sealing material.

89. A liquid crystal filling method comprising:

(1) a step of preparing first and second substrates;

(2) a step of placing an amount of liquid crystal on the first substrate;

(3) a step of laying the second substrate on the first substrate coincident with each other;

(4) a step of applying pressure to the second substrate toward the first substrate; and (5) a step of making a barrier and a sealing structure on the periphery of the first and second substrates, wherein a color filter is formed between the liquid crystal and at least one of the first and second substrates.

90. A liquid crystal filling method comprising:

(1) a step of preparing first and second substrates;

(2) a step of placing an amount of liquid crystal on the first substrate;

(3) a step of laying the second substrate on the first substrate coincident with each other;

(4) a step of applying pressure to the second substrate toward the first substrate in a chamber by evacuating the chamber with the first and second substrates located in the chamber; and (5) a step of making a sealing structure on the periphery of the first and second substrates, wherein a color filter is formed between the liquid crystal and at least one of the first and second substrates.

91. A liquid crystal filling method comprising:

(1) a step of preparing first and second substrates;

(2) a step of placing an amount of liquid crystal on the first substrate;

(3) a step of laying the second substrate on the first substrate coincident with each other;

(4) a step of applying pressure to the second substrate toward the first substrate; and (5) a step of making a sealing structure on the periphery of the first and second substrates, wherein the method further comprises a step of treating the liquid crystal on the first substrate so that the liquid crystal has low viscosity, wherein a color filter is formed between the liquid crystal and at least one of the first and second substrates.

92. A liquid crystal filling method comprising:

(1) a step of preparing first and second substrates;

(2) a step of placing an amount of liquid crystal on the first substrate;

(3) a step of laying the second substrate on the first substrate coincident with each other;

(4) a step of applying pressure to the second substrate toward the first substrate; and (5) a step of making a barrier and a sealing structure on the periphery of the first and second substrates, wherein an electrode having an orientation-treated surface is formed between the liquid crystal and at least one of the first and second substrates.

93. A liquid crystal filling method comprising:

(1) a step of preparing first and second substrates;

(2) a step of placing an amount of liquid crystal on the first substrate;

(3) a step of laying the second substrate on the first substrate coincident with each other;

(4) a step of applying presure to the second substrate toward the first substrate in a chamber by evacuating the chamber with the first and second substrates located in the chamber; and (5) a step of making a sealing structure on the periphery of the first and second substrates, wherein an electrode having an orientation-treated surface is formed between the liquid crystal and at least one of the first and second substrates.

94. A liquid crystal filling method comprising:

(1) a step of preparing first and second substrates;

(2) a step of placing an amount of liquid crystal on the first substrate;

(3) a step of laying the second substrate on the first substrate coincident with each other;

(4) a step of applying pressure to the second substrate toward the first substrate; and (5) a step of making a sealing structure on the periphery of the first and second substrates, wherein the method further comprises a step of treating the liquid crystal on the first substrate so that the liquid crystal has low viscosity, wherein an electrode having an orientation-treated surface is formed between the liquid crystal and at least one of the first and second substrates.

95. A liquid crystal filling method comprising:

(1) a step of preparing first and second substrates;

(2) a step of placing an amount of liquid crystal on the first substrate;

(3) a step of laying the second substrate on the first substrate coincident with each other;

(4) a step of applying pressure to the second substrate toward the first substrate; and (5) a step of making a barrier and a sealing structure on the periphery of the first and second substrates, wherein at least one of an electrode, a filter, an oriented film, a shadow mask and and active element is formed between the first and second substrates.

96. A liquid crystal filling method comprising:

(1) a step of preparing first and second substrates;

(2) a step of placing an amount of liquid crystal on the first substrate;

(3) *a step of laying the second substrate on the first substrate coincident with each other;*

(4) *a step of applying pressure to the second substrate toward the first substrate in a chamber by evacuating the chamber with the first and second substrates located in the chamber; and*

(5) *a step of making a sealing structure on the periphery of the first and second substrates,*

*wherein at least one of an electrode, a filter, an oriented film, as shadow mask and an active element is formed between the first and second substrates.*

97. *A liquid crystal filling method comprising:*

(1) *a step of preparing first and second substrates;*

(2) *a step of placing an amount of liquid crystal on the first substrate;*

(3) *a step of laying the second substrate on the first substrate coincident with each other;*

(4) *a step of applying pressure to the second substrate toward the first substrate; and*

(5) *a step of making a sealing structure on the periphery of the first and second substrates,*

*wherein the method further comprises a step of treating the liquid crystal on the first substrate so that the liquid crystal has low viscosity,*

*wherein at least on of an electrode, a filter, an oriented film, a shadow mask and an active element is formed between the first and second substrates.*

98. *A liquid crystal filling method comprising:*

(1) *a step of preparing first and second substrates;*

(2) *a step of placing an amount of liquid crystal on the first substrate;*

(3) *a step of laying the second substrate on the first substrate coincident with each other;*

(4) *a step of applying pressure to the second substrate toward the first substrate; and*

(5) *a step of making a sealing structure on the periphery of the first and second substrates so that the liquid crystal is surrounded by a resin,*

*wherein the method further comprises a step of treating the liquid crystal on the first substrate so that the liquid crystal has low viscosity.*

99. *A liquid crystal filling method comprising:*

(1) *a step of preparing first and second substrates;*

(2) *a step of placing an amount of liquid crystal on the first substrate;*

(3) *a step of laying the second substrate on the first substrate coincident with each other;*

(4) *a step of applying pressure to the second substrate toward the first substrate in a chamber by evacuating the chamber with the first and second substrates located in the chamber; and*

(5) *a step of making a sealing structure on the periphery of the first and second substrates so that the liquid crystal is surrounded by a resin.*

100. *A liquid crystal filling method comprising:*

(1) *a step of preparing first and second substrates;*

(2) *a step of placing an amount of liquid crystal on the first substrate;*

(3) *a step of laying the second substrate on the first substrate coincident with each other;*

(4) *a step of applying pressure to the second substrate toward the first substrate; and*

(5) *a step of making a sealing structure on the periphery of the first and second substrates so that the liquid crystal is surrounded by a resin,*

*wherein the method further comprises a step of treating the liquid crystal on the first substrate so that the liquid crystal has low viscosity.*

101. *A liquid crystal filling method comprising:*

(1) *a step of preparing first and second substrates;*

(2) *a step of placing an amount of liquid crystal on the first substrate;*

(3) *a step of laying the second substrate on the first substrate coincident with each other;*

(4) *a step of applying pressure to the second substrate toward the first substrate; and*

(5) *a step of making a barrier and a sealing structure on the periphery of the first and second substrates,*

*wherein the method further comprises a step of providing a spacer between the first and second substrates,*

*wherein a diameter of the spacer is corresponding to a gap between the first and second substrates.*

102. *A liquid crystal filling method comprising:*

(1) *a step of preparing first and second substrates;*

(2) *a step of placing an amount of liquid crystal on the first substrate;*

(3) *a step of laying the second substrate on the first substrate coincident with each other;*

(4) *a step of applying pressure to the second substrate toward the first substrate in a chamber by evacuating the chamber with the first and second substrates located in the chamber; and*

(5) *a step of making a sealing structure on the periphery of the first and second substrates,*

*wherein the method further comprises a step of providing a spacer between the first and second substrates,*

*wherein a diameter of the spacer is corresponding to a gap between the first and second substrates.*

103. *A liquid crystal filling method comprising:*

(1) *a step of preparing first and second substrates;*

(2) *a step of placing an amount of liquid crystal on the first substrate;*

(3) *a step of laying the second substrate on the first substrate coincident with each other;*

(4) *a step of applying pressure to the second substrate toward the first substrate; and*

(5) *a step of making a sealing structure on the periphery of the first and second substrates,*

*wherein the method further comprises a step of treating the liquid crystal on the first substrate so that the liquid crystal has low viscosity,*

*wherein the method further comprises a step of providing a spacer between the first and second substrates,*

*wherein a diameter of the spacer is corresponding to a gap between the first and second substrates.*

104. *A liquid crystal filling method comprising:*

(1) *a step of preparing first and second substrates provided with active elements;*

(2) *a step of placing an amount of liquid crystal on the first substrate;*

(3) *a step of laying the second substrate on the first substrate coincident with each other;*

(4) *a step of applying pressure to the second substrate toward the first substrate; and*

(5) a step of making a barrier and a sealing structure on the periphery of the first and second substrates, wherein a color filter is formed between the liquid crystal and at least one of the first and second substrates.

105. A liquid crystal filling method comprising:

(1) a step of preparing first and second substrates provided with active elements;

(2) a step of placing an amount of liquid crystal on the first substrate;

(3) a step of laying the second substrate on the first substrate coincident with each other;

(4) a step of apply pressure to the second substrate toward the first substrate in a chamber by evacuating the chamber with the first and second substrates located in the chamber; and (5) a step of making a sealing structure on the periphery of the first and second substrates, wherein a color filter is formed between the liquid crystal and at least one of the first and second substrates.

106. A liquid crystal filling method comprising:

(1) a step of preparing first and second substrates provided with active elements;

(2) a step of placing an amount of liquid crystal on the first substrate;

(3) a step of laying the second substrate on the first substrate coincident with each other;

(4) a step of applying pressure to the second substrate toward the first substrate; and (5) a step of making a sealing structure on the periphery of the first and second substrates, wherein the method further comprises a step of treating the liquid crystal on the first substrate so that the liquid crystal has low viscosity, wherein a color filter is formed between the liquid crystal and at least one of the first and second substrates.

107. a liquid crystal filling method comprising:

(1) a step of preparing first and second substrates;

(2) a step of placing an amount of liquid crystal on the first substrate;

(3) a step of laying the second substrate on the first substrate coincident with each other;

(4) a step of applying pressure to the second substrate toward the first substrate; and (5) a step of making a barrier and a sealing structure on the periphery of the first and second substrates, wherein at least one of the first and second substrates is a flexible substrate.

108. A liquid crystal filling method comprising:

(1) a step of preparing first and second substrates;

(2) a step of placing an amount of liquid crystal on the first substrate;

(3) a step of laying the second substrate on the first substrate coincident with each other;

(4) a step of applying pressure to the second substrate toward the first substrate in a chamber by evacuating the chamber with the first and second substrates located in the chamber; and (5) a step of making a sealing structure on the periphery of the first and second substrates, wherein at least one of the first and second substrates is a flexible substrate.

109. A liquid crystal filling method comprising:

(1) a step of preparing first and second substrates;

(2) a step of placing an amount of liquid crystal on the first substrate;

(3) a step of laying the second substrate on the first substrate coincident with each other;

(4) a step of applying pressure to the second substrate toward the first substrate; and (5) a step of making a barrier and a sealing structure on the periphery of the first and second substrates, wherein the method further comprises a step of treating the liquid crystal on the first substrate so that the liquid crystal has low viscosity, wherein at least one of the first and second substrates is a flexible substrate.

110. A liquid crystal filling method comprising:

(1) a step of preparing first and second substrates provided with active elements;

(2) a step of placing an amount of liquid crystal on the first substrate;

(3) a step of laying the second substrate on the first substrate coincident with each other;

(4) a step of applying pressure to the second substrate toward the first substrate in a chamber by evacuating the chamber with the first and second substrates located in the chamber; and (5) a step of making a sealing structure on the periphery of the first and second substrates, wherein the liquid crystal is filled so as not to overflow from the first and second substrates.

111. A liquid crystal filling method comprising:

(1) a step of preparing first and second substrates provided with active elements;

(2) a step of placing an amount of liquid crystal on the first substrate;

(3) a step of laying the second substrate on the first substrate coincident with each other;

(4) a step of applying pressure to the second substrate toward the first substrate; and (5) a step of making a sealing structure on the periphery of the first and second substrates, wherein the method further comprises a step of treating the liquid crystal on the first substrate so that the liquid crystal has low viscosity, wherein the liquid crystal is filled so as not to overflow from the first and second substrates.

112. A liquid crystal filling method comprising:

(1) a step of preparing first and second substrates provided with active elements;

(2) a step of placing an amount of liquid crystal on the first substrate;

(3) a step of laying the second substrate on the first substrate coincident with each other;

(4) a step of applying pressure to the second substrate toward the first substrate by evacuating the chamber with the first and second substrates located in the chamber so that the liquid crystal is extended between the first substrate and the second substrate without overflowing; and (5) a step of making a sealing structure on the periphery of the first and second substrates.

113. A liquid crystal filling method comprising:

(1) a step of preparing first and second substrates provided with active elements;

(2) *a step of placing an amount of liquid crystal on the first substrate;*

(3) *a step of laying the second substrate on the first substrate coincident with each other;*

(4) *a step of applying pressure to the second substrate toward the first substrate so that the liquid crystal is extended between the first substrate and the second substrate without overflowing; and*

(5) *a step of making a sealing structure on the periphery of the first and second substrates,* wherein the method further comprises a step of treating the liquid crystal on the first substrate so that the liquid crystal has low viscosity.

114. *A method according to any one of claims 83–106 and 110–113, wherein at least one of the first and second substrates is a glass substrate.*

115. *A liquid crystal filling method comprising:*

(1) *a step of preparing first and second substrates;*

(2) *a step of placing an amount of liquid crystal on plural locations of the first substrate;*

(3) *a step of laying the second substrate on the first substrate coincident with each other;*

(4) *a step of applying pressure to the second substrate toward the first substrate by utilizing a pressure difference between an inside of the first and second substrates and an outside thereof; and*

(5) *a step of making a sealing structure on the periphery of the first and second substrates.*

116. *A method according to claim 115, wherein the method further comprises a step of treating the liquid crystal on the first substrate so that the liquid crystal has low viscosity.*

117. *A method according to claim 115, wherein a barrier is formed on the periphery of the first and second substrates.*

118. *A method according to claim 31, wherein the method further comprises a step of covering a periphery of the first and second substrates with a plastic sealing material.*

119. *A method according to claim 98, wherein the method further comprises a step of covering a periphery of the first and second substrates with a plastic sealing material.*

120. *A method according to claim 99, where the method further comprises a step of covering a periphery of the first and second substrate with a plastic sealing material.*

\* \* \* \* \*